US010560439B2

(12) United States Patent
Seetharam et al.

(10) Patent No.: US 10,560,439 B2
(45) Date of Patent: Feb. 11, 2020

(54) SYSTEM AND METHOD FOR DEVICE AUTHORIZATION AND REMEDIATION

(71) Applicant: ARRIS Enterprises, Inc., Suwanee, GA (US)

(72) Inventors: Ananth Seetharam, Bangalore (IN); Sean J. Higgins, Auckland (NZ); Martin Karlsson, Auckland (NZ); Paul R. Osborne, Auckland (NZ); Anton Koukine, Auckland (NZ)

(73) Assignee: ARRIS Enterprises, Inc., Suwanee, GA (US)

( * ) Notice: Subject to any disclaimer, the term of this patent is extended or adjusted under 35 U.S.C. 154(b) by 168 days.

(21) Appl. No.: 14/670,611

(22) Filed: Mar. 27, 2015

(65) Prior Publication Data

US 2015/0281190 A1    Oct. 1, 2015

Related U.S. Application Data

(60) Provisional application No. 61/971,060, filed on Mar. 27, 2014.

(51) Int. Cl.
| | |
|---|---|
| *G06F 12/14* | (2006.01) |
| *G06F 21/10* | (2013.01) |
| *H04L 29/06* | (2006.01) |
| *G06F 21/86* | (2013.01) |
| *H04L 9/32* | (2006.01) |

(52) U.S. Cl.
CPC .......... *H04L 63/0435* (2013.01); *G06F 21/10* (2013.01); *G06F 21/86* (2013.01); *G06F 2221/0735* (2013.01); *G06F 2221/2143* (2013.01)

(58) Field of Classification Search
CPC .......... G06F 21/10; G06F 21/86; G06F 21/57; G06F 21/577; G06F 2221/0735; G06F 2221/2143; H04L 2463/101; H04L 2463/103; H04L 63/10; H04L 63/0435
See application file for complete search history.

(56) References Cited

U.S. PATENT DOCUMENTS

| | | | | |
|---|---|---|---|---|
| 5,579,222 A | * | 11/1996 | Bains | G06F 11/34 705/16 |
| 7,218,567 B1 | * | 5/2007 | Trimberger | G11C 5/141 365/189.08 |
| 8,051,490 B2 | * | 11/2011 | Nomura | G06F 21/62 705/57 |
| 9,143,509 B2 | * | 9/2015 | Rose | G06F 21/74 |

(Continued)

OTHER PUBLICATIONS

Yu, Aimin, Dengguo Feng, and Ren Liu. "Tbdrm: A tpm-based secure drm architecture." Computational Science and Engineering, 2009. CSE'09. International Conference on. vol. 2. IEEE, 2009.*

*Primary Examiner* — Michael Simitoski

(74) *Attorney, Agent, or Firm* — Bart A. Perkins

(57) ABSTRACT

A method is provided for authorizing a device for consuming content. In method includes the steps of generating an authorization request, the authorization request for authorization data including device diagnostic data (instructions) an device remedial data (instructions), transmitting the authorization request from the device to an authorizing service, and authorizing or remediating the device according to an authorization response to the authorization request received from an authorization server.

15 Claims, 6 Drawing Sheets

(56) References Cited

U.S. PATENT DOCUMENTS

| | | | |
|---|---|---|---|
| 2001/0011254 A1* | 8/2001 | Clark | G06F 21/125 705/59 |
| 2002/0012432 A1* | 1/2002 | England | G06F 21/71 380/231 |
| 2002/0099952 A1* | 7/2002 | Lambert | G06F 21/51 726/27 |
| 2002/0194010 A1* | 12/2002 | Bergler | G06Q 50/184 705/310 |
| 2003/0046536 A1* | 3/2003 | Bruekers | G06Q 10/10 713/158 |
| 2005/0028006 A1* | 2/2005 | Leser | H04L 9/08 726/26 |
| 2006/0085826 A1* | 4/2006 | Funk | H04N 7/17318 725/87 |
| 2006/0143481 A1* | 6/2006 | Morten | G06F 21/10 713/193 |
| 2007/0112683 A1* | 5/2007 | Gleichauf | G06Q 99/00 705/59 |
| 2007/0113266 A1* | 5/2007 | Ross | G06F 21/10 726/1 |
| 2007/0185814 A1* | 8/2007 | Boccon-Gibod | G06F 21/10 705/51 |
| 2007/0192631 A1* | 8/2007 | Anderson | G06F 21/78 713/193 |
| 2008/0071689 A1* | 3/2008 | Tabet | G06F 8/60 705/59 |
| 2008/0155649 A1* | 6/2008 | Maler | G06F 21/6218 726/1 |
| 2009/0240938 A1* | 9/2009 | Durand | G06F 21/31 713/168 |
| 2009/0251282 A1 | 10/2009 | Fitzgerald et al. | |
| 2010/0063855 A1* | 3/2010 | Nguyen | G06F 19/327 709/224 |
| 2010/0303240 A1* | 12/2010 | Beachem | G06F 21/57 380/277 |
| 2011/0030069 A1 | 2/2011 | Koukine et al. | |
| 2012/0102329 A1* | 4/2012 | Mittal | G06F 21/10 713/176 |
| 2012/0251076 A1* | 10/2012 | Stewart | H04N 5/913 386/252 |
| 2013/0007245 A1* | 1/2013 | Malik | H04L 41/0816 709/223 |
| 2013/0157644 A1* | 6/2013 | Berg | H04W 24/04 455/418 |
| 2013/0198848 A1 | 8/2013 | Wolff | |
| 2013/0227636 A1* | 8/2013 | Bettini | H04W 4/001 726/1 |
| 2014/0040630 A1* | 2/2014 | Swaminathan | G06F 21/10 713/187 |
| 2014/0053229 A1* | 2/2014 | Saib | G06F 21/10 726/1 |
| 2014/0150080 A1* | 5/2014 | Miller | G06F 21/10 726/9 |
| 2014/0282882 A1* | 9/2014 | Tsui | G06F 21/10 726/4 |
| 2014/0297756 A1* | 10/2014 | Qureshi | H04L 41/0816 709/205 |
| 2015/0033023 A1* | 1/2015 | Xu | H04L 9/3247 713/176 |
| 2015/0033031 A1* | 1/2015 | Swaminathan | G06F 21/577 713/187 |
| 2015/0085848 A1* | 3/2015 | Reunamaki | H04W 12/04 370/338 |
| 2015/0172925 A1* | 6/2015 | Leppanen | H04W 12/04 726/7 |
| 2015/0264087 A1* | 9/2015 | Lal | H04L 63/20 726/1 |
| 2016/0034876 A1* | 2/2016 | Speiser | G06Q 30/06 705/21 |
| 2017/0024739 A1* | 1/2017 | Todasco | G06Q 20/4014 |

* cited by examiner

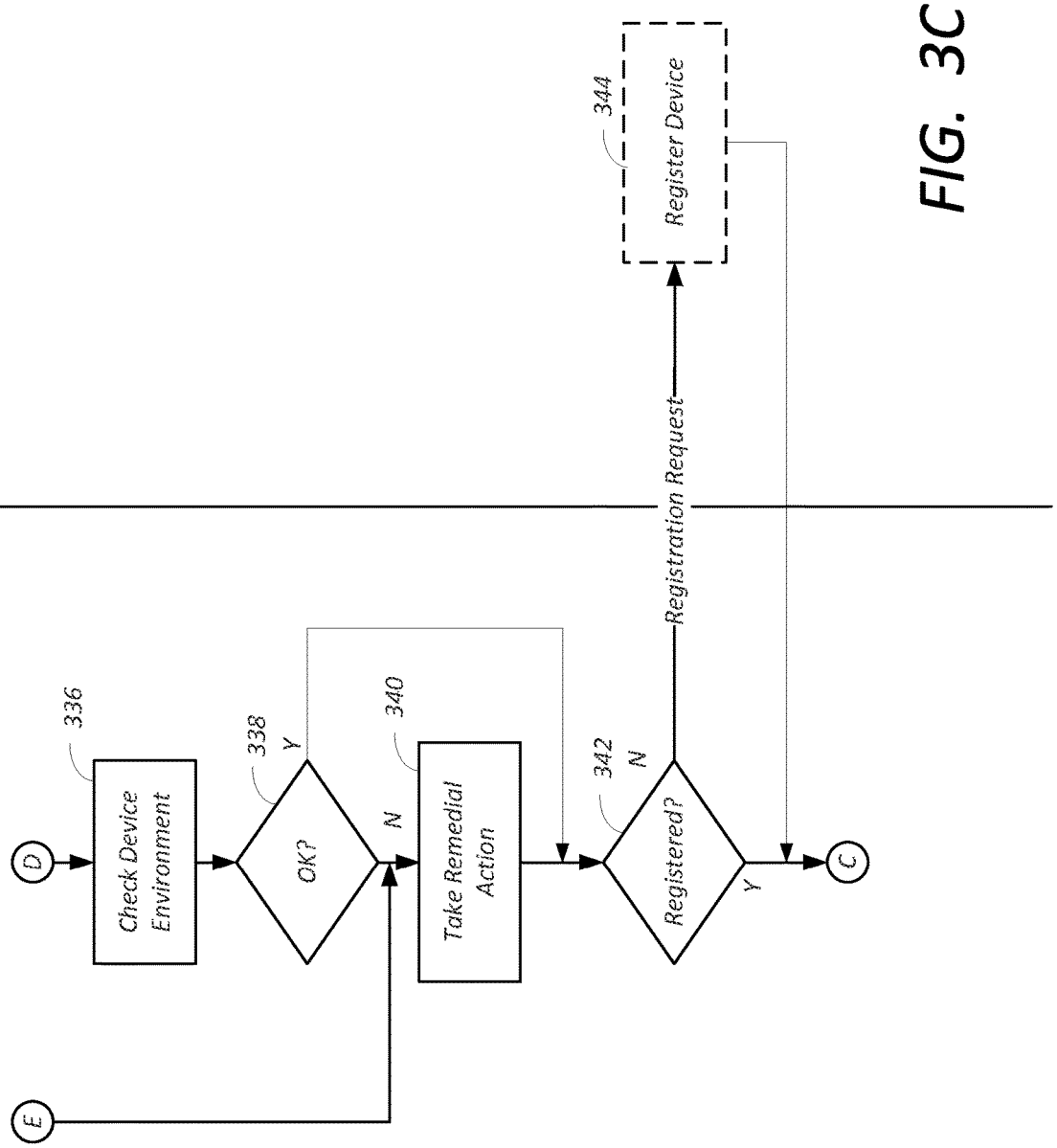

SYSTEM AND METHOD FOR DEVICE AUTHORIZATION AND REMEDIATION

CROSS-REFERENCE TO RELATED APPLICATION

This application claims benefit of U.S. Provisional Patent Application No. 61/971,060, entitled "SYSTEM AND METHOD TO AUTHORIZE DEVICE," by Ananth Seetharam, Sean J. Higgins, Martin Karlsson, Paul R. Osborne, and Anton Koukine, filed Mar. 27, 2014, which application is hereby incorporated by reference herein.

BACKGROUND

1. Field of the Invention

The present invention relates to systems and methods for authorizing devices to replay media content such as video programs, and in particular to a system and method for device authorization and remediation.

2. Description of the Related Art

In the past two decades, digital rights management (DRM) technologies have been developed to protect digital media content such as video programs and audio from unauthorized distribution and/or consumption. DRM technologies perform a host of functions including, install authorizations, watermarking of digital content, and digitally locking the media content so that it cannot be consumed without authorization. Digitally locking the media content itself is typically accomplished by encrypting the content or a function necessary to decrypt the content using keys that are only accessible to or derivable by authorized entities.

No DRM system is one hundred percent secure, and DRM systems are under constant attack by unauthorized users and their agents. Devices which have been "hacked" or compromised can allow unauthorized users to consume protected content and distribute it to others. For example, this may be accomplished on an ANDROID device by allowing applications to invoke super user ("su") privileges.

One means for dealing with this problem is to occasionally check the playback devices to confirm that their configuration is approved (e.g. the device has not been compromised), and to update the DRM systems or functions implemented in such devices, typically through remote means as necessary. One example of such periodic updates is periodic online authorization, whereby content consumption devices must occasionally refresh their credentials to consume the protected content, obtain updated keys, or updated DRM software and data. Such systems have the advantage of allowing the content owner or device manufacturer to close "holes" in the DRM techniques implemented in such devices as the holes are identified, essentially making the DRM system a moving target for hackers.

Currently, there are two possible ways to implement the foregoing technique. The first is a local "precondition" check that is performed prior to executing the process that enables decryption of the protected content. The application executing on the device 102 locally evaluates the device environment and locally determines whether that environment is a permitted configuration. If the device configuration is as expected, normal content consumption processing can proceed. However, if the device configuration is not as expected, the application necessary to consume the digital content (e.g. the media player application 114 and/or associated DRM plug-ins exit and the device 102 can no longer be used. While this approach can be effective, false positives (indicating that the device is not in a permitted environment when it in fact is in a permitted environment) require a new version of the application to be installed on the device 102. Further, once installed, the new version of the application(s) 114 typically must typically be restarted manually by the user. This is an all or none approach in which execution either continues normally or halts altogether depending upon whether the device 102 configuration is as expected.

The second possible solution also involves a precondition check, but the check is performed by an authorization server or other entity, typically remote from the device 102m not the device 102 itself. In this paradigm, the application uploads a description of the device configuration to a server, and awaits instructions from that server regarding how to further proceed. One example of this paradigm is evidenced by U.S. Patent Application 2011/0030069, for "System and method for Preventing Unauthorized Use of Digital Media," hereby incorporated by reference herein. Using this method, the client device receives a list of blacklisted items such as processes, instructions, activity descriptions or data types that must not be active concurrent with the playback of digital content. The client device checks for the presence of any such blacklisted items, and with continuing communication with the server, permits key management and playback of the protected content only if no items on the list are detected on the client. While this solution is more resilient to false positives, it may result in a loss of the user's privacy because it transmits information about the client device to the authorization server.

Other solutions are also known. For example, U.S. Patent Application 2009/0251282, for "System for Mitigating the Unauthorized Use of a Device," incorporated by reference herein, discloses another technique. A device monitors its use, it's local environment, an/or it's operating context to determine that the device is no longer in the control of an authorized user. The device may receive communications or generate an internal signal altering its functionality, such as instructing the device to enter a restricted use mode, a surveillance mode, to provide instructions to return the device and/or to prevent unauthorized use or unauthorized access to data. The device may also gather forensic data regarding an unauthorized user to assist in locating the unauthorized user and/or the device. However, the device does not allow a remote server to describe or configure the required environment to the client or the remedial action to be undertaken if the device is not in the required environment.

Accordingly, there is a need to determine a remedial action to be performed by a content consumption device upon the detection of an unexpected, unpermitted, or forbidden device environment in such a way that addresses false positives and does not compromise the user's privacy. This disclosure describes a solution to this need.

SUMMARY

To address the requirements described above, a method, apparatus, and article of manufacture for authorizing a device for consuming content is disclosed herein. In one embodiment described from the device perspective the method comprises the steps of generating an authorization request, the authorization request for authorization data comprising device diagnostic data an device remedial data, transmitting the authorization request from the device to an authorizing service on a remote check and action server, and authorizing or remediating the device according to an authorization response to the authorization request received from the check and action server. In another embodiment described from the authorization service's perspective, the method comprises receiving an authorization request from a device in an authorizing service, the authorization request for authorizing data, generating the authorization data comprising device diagnostic data and device remedial data, the device diagnostic data comprising a meta description of a required configuration of the device for the playing back of the content and the device remedial data describing required device remedial action to be performed if the device is not in the required configuration, and transmitting an authorization response from the authorization service to the device, the authorization response comprising the authorization data, wherein the device determines the configuration of the device and performs the remedial action according to the determined configuration of the device, the required configuration of the device, and the device remedial data.

Another disclosed embodiment is evidenced by an apparatus for playing back content. The apparatus may comprise a processor, a persistent memory for storing instructions comprising instructions for generating an authorization request, the authorization request for authorization data comprising device diagnostic data (instructions) an device remedial data (instructions) transmitting the authorization request from the device to an authorizing service; and authorizing or remediating the device according to an authorization response to the authorization request received from an authorization service.

BRIEF DESCRIPTION OF THE DRAWINGS

Referring now to the drawings in which like reference numbers represent corresponding parts throughout:

FIGS. 3A-3C are diagrams illustrating a exemplary embodiments of techniques for authenticating a client device.

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Figure 1:
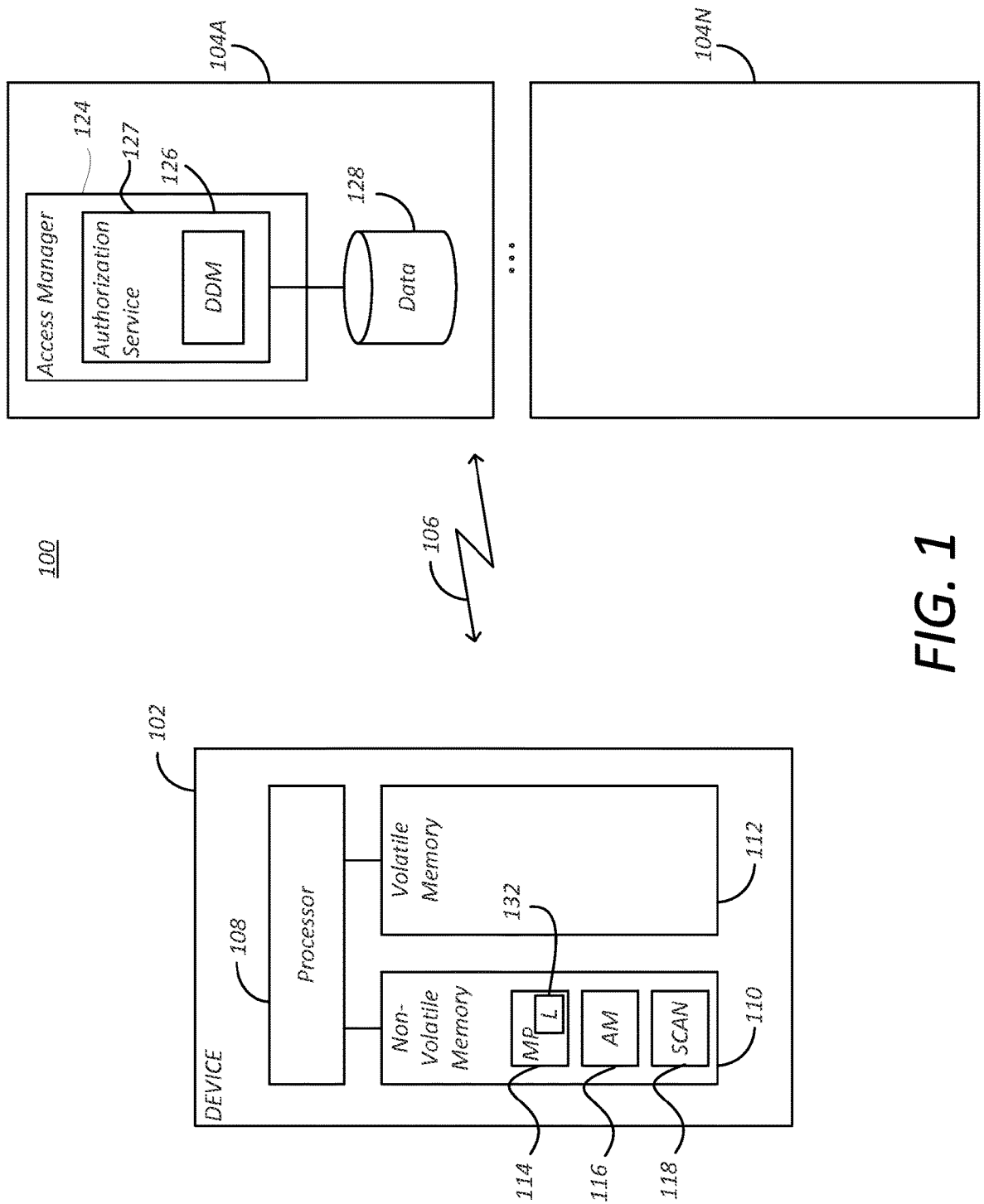
FIG. 1 is a diagram presenting an illustration of an exemplary content distribution system.

FIG. 1 is a schematic diagram showing content distribution system 100. The system 100 comprises one or more client devices 102, which obtain content from one or more service providers 104A and 104B.

The client device 102 is configured to accept content from the service provider(s) 104 and present the content to the user for consumption. In one embodiment, the content comprises a media program such as a video and/or audio program, and the client device is a device configured to play back the video and/or audio program in accordance with user commands. As described above, the content itself is typically protected from unauthorized use (including consumption, copying, or distribution) by use of DRM techniques. The DRM techniques used by the service providers 104A, 104B are typically different and incompatible with one another, but this need not be the case.

Service providers 104 provide the client 120 with access to the content. The content providers typically handle not only the delivery of the content itself, but may also handle DRM functions, including encryption the content and providing information to the client device 102 to enable it to decrypt and present the content. As further described below, the content provider may store or have access to a device diagnostic data (for example, blacklist data stored in a database 128) and a manager 126 for managing the diagnostic data, as further described herein.

The client device 102 communicates with the content providers 104 via one or more communication links 106. Typically, at least one of the communication links 106 includes the Internet, but may also include local area networks (LANs), wide area networks (WANs) and direct connections such as the public switched telephone network (PSTN) or analogous cellphone network.

The client device 120 is any client capable of consuming the content, for example by playing digital media. Exemplary embodiments of the client device 102 include a personal computer, set top box or personal data assistant (PDA), smartphone, tablet computer, or MP3 player.

The client device 102 comprises a processor 108 communicatively coupled to a non-volatile memory 110 and a volatile memory 112. Either the volatile memory 110 or the non-volatile memory 112 may be read only memory (ROM) or random access memory (RAM). Either the volatile memory 110 or the non-volatile memory 112 can be used to implement persistent storage of data (e.g. in persistent memory) or impersistent storage of data. Persistent data can be said to be stored in persistent memory (or stored persistently), which is a memory (or technique) for storing data structures in a memory such that they can continue to be accessed using memory instructions or memory application program interfaces (APIs) even after the end of the process that created or last modified them. Impersistent data can be said to be stored in impersistent memory (or stored impersistently), which is a memory (or technique) for storing data structures such that they cannot be continued to be accesses after the end of the process that created them or when the device implementing the memory or processes is shut down. For example, operating system (OS) instructions are typically persistently stored so that they may be read and later used after device shut down.

The client 120 as shown in FIG. 1 includes a media player 114, such as REAL PLAYER or WINDOWS Media Player. The client device 102 may also execute an access manager daemon 116 including a diagnostic scanner 118 in association with the media player 114.

Each service provider 104A-104N (hereinafter alternatively referred to as service provider 104) includes an access manager 124. The access manager 124 is responsible for the establishment of a secure communication channel for the transport of confidential information such as digital rights information to and from the client 102. Hence, if communication connectivity with the access manager 124 is unavailable or compromised, any playback or use of the content requiring the confidential information such as digital rights information will be compromised as well.

The service provider 104 further comprises an authorization service 127 either implemented by or residing behind the access manager 124. Further, the authorization service 127 includes or has access to a diagnostic data manager (DDM) 126, as set forth more fully below.

The system 100 provides protection against unauthorized use of digital media by assuring that the client device 102 environment and/or configuration is as required for safe consumption of the content. In one embodiment, this is accomplished by transmitting an authorization request from the client device 102 to a remote authorization service 127, and in response, receiving an authorization response that includes an expected device environment and/or configuration, and data describing remedial actions to be taken depending on the whether a determined device 102 environment and/or configuration is as expected. The information transmitted from the authorization service 127 may also include instructions for performing the check of the environment and/or configuration of the client device 102. In one embodiment, checking the configuration/environment of the client device 102 comprises checking the client device 102 for threatening processes or data types running on the client system, and performing appropriate remedial action. Such threatening processes or data types can be described in a blacklist transmitted to the client device 102. In operation, following a request from the client device 102 to use (e.g. play or copy) content, a diagnostic data manager 126 of an authorization service 127 sends a message comprising a list taken from the diagnostic database 128 and remedial action data to the scanner 118 running on the client device 102 via the communication link 106. The scanner 118 scans the client device 102 according to the diagnostic data to determine if the device 102 environment is as expected.

In embodiments wherein the diagnostic data comprises a blacklist, the scanner 118 checks for the presence of any of the items on the list running on the client device 102. The diagnostic scanner 118 can be configured to check particular locations on the client device 102 such as the system configuration data stored for example in the "/etc." directory on an embedded Unix platform or the registry on a Microsoft Windows PC and task list, or may check the entire client device 102 including the hard disk if so equipped.

DRM procedures, decryption key management or media download can continue while the diagnostic scanner 118 carries out checks. If the diagnostic scanner 118 detects a client device 102 configuration that is not as expected (e.g. detects the presence of an item on the blacklist), the access manager daemon 116 executing on the client device 102 takes appropriate action, as described in the remedial action data transmitted to the client device 102. The remedial action may break the communication channel with the authorization service, content server 204 or key server 206 (described below) and/or cause all the media player application 114 and all associated processes to cease. The media player 114 may also include an embedded decryption plug-in library 132 as an anti-piracy component. The plug-in library 132 is associated with the access manager daemon 116 and when an item on the blacklist is detected on the client 120, the plug-in library 132 acts to prevent the media player 114 from decrypting any media files or streams associated with the anti-piracy service. Depending upon the remedial action specified in the remedial data, the media player 114 may be disabled from playing the media requested via the access manager daemon 116 and may or may not be disabled from playing other media. This may be accomplished, for example, by deleting the keys or other elements necessary for decryption of the media from the plug-in library 132.

This scanning process can be limited to checking for items running on the client device 102 (as opposed to also scanning for items stored on the device 102 but not executing) and can be carried out at intervals during registration, secure channel set up, download and playing of digital media files. The scanning process may be carried out on a continuous basis in the background and asynchronously to any other processes. The diagnostic data transfer and scanning process is optionally part of the set up of a secure channel between the client device 102 and the content provider 104.

Examples of threatening processes that could be included on the blacklist are debuggers, video frame grabbers. The list may include file or program names, digital signatures associated with threatening processes, registry entries.

The diagnostic data may be prioritized so that, once certain checks have been made, the media decryption process can continue while further checks are made in the background. The choice of the number of checks made before any further processes can continue is a balance between providing a user friendly system and providing security for the media.

Different levels of security may be implemented in the system of the present invention depending on the perceived level of threat. If at a particular time there is known to be threatening software of a certain type in wide circulation, the corresponding item in the diagnostic data can be given high priority and checked for more frequently than during normal operation.

Following termination of a connection with the access manager 124 because of a detected threat, assuming the threat is no longer active on the client device 102, standard reconnection can occur without any detrimental affect on the client device 102 software. Optionally, the client device 102 may be required to re-register with the service provider 104 if there is an increased perceived threat level at that time. Tamper detection is possible without any information about the software or data on the client device 102 being necessary reported to the access manager 124 (apart from the access manager daemon 116 version number). Alternatively the required current version of the daemon 116 may be downloaded to the client device 102 and checked.

Although FIG. 1 illustrates a preferred embodiment wherein each service provider 104 maintains its own authorization service 127, embodiments are envisioned wherein multiple service providers 104 share an authorization service 127.

Figure 2:
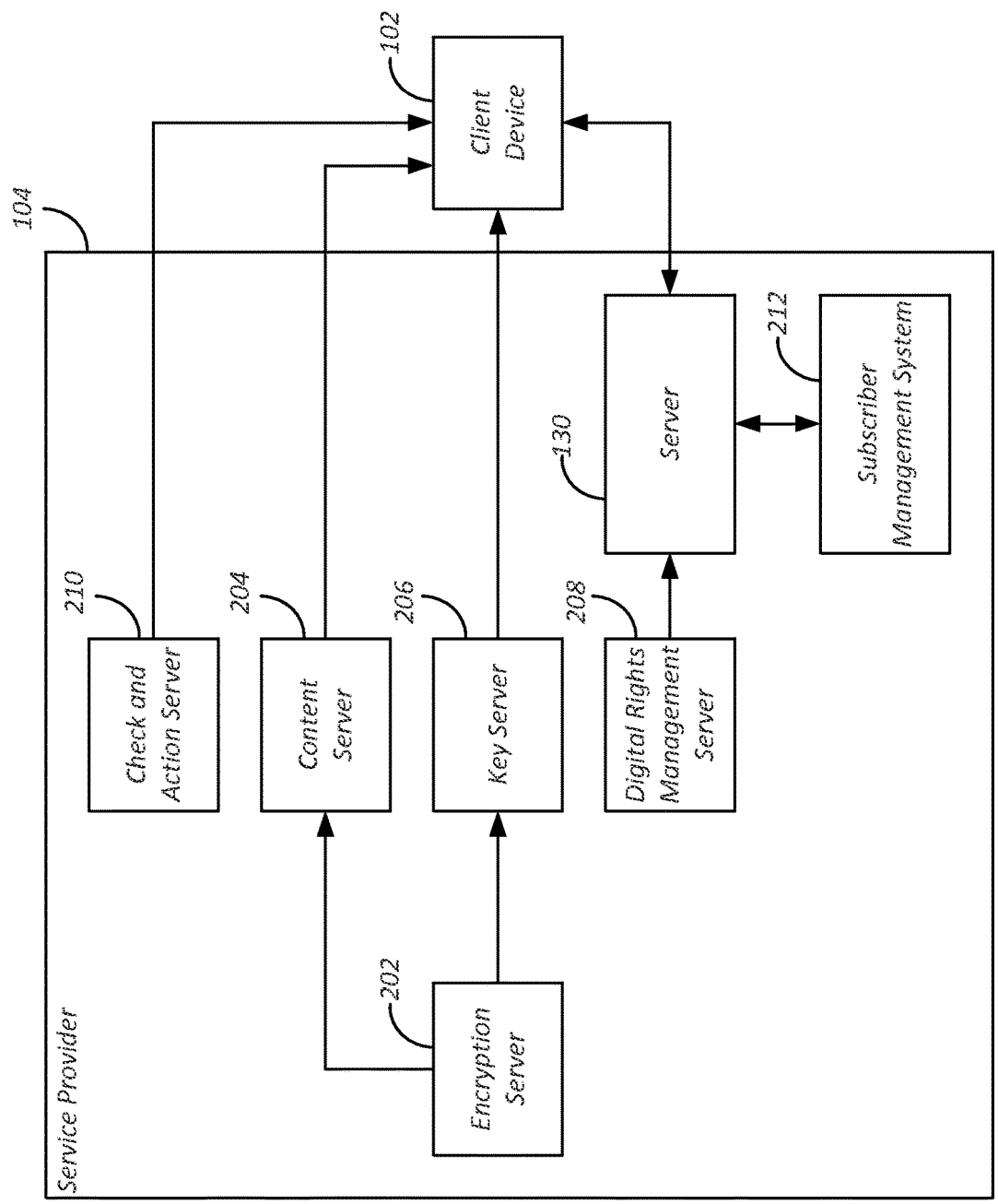
FIG. 2 is a diagram further illustrating the content distribution system.

FIG. 2 is a diagram further illustrating the CDS 100. The client device 102 is in communication with the service provider 104, as described with reference to FIG. 1, including but not limited to a to a content server 204 and an encryption key server 206. The system 100 also includes an encryption server 202 for encrypting the content and generating keys for decryption of the encrypted content and a DRM server 208. The encryption server 202 is communicatively coupled to the media server 220 to provide the encrypted content and to the key server 230 to provide the keys to the client device 102 for decrypting the encrypted content. The system 100 may also further comprise a subscriber management system 212 communicatively coupled to the server 130. The subscriber management system 200 stores the DRM registration details, including but not limited to a password and billing details and client identification information, including but not limited to client name, and a client specific key.

The system shown in FIG. 2 separates the delivery of content from the delivery of decryption keys and from the delivery of rights to access the keys and/or the media. The content, keys, and rights may be delivered via distinct communication paths as shown in FIG. 2, or may be delivered via the same communication path(s). For example, a first communication path can be used for delivery of content, while a second (and potentially more secure) communication path is used for delivery of keys and rights. Also, delivery of content, keys, and rights may be temporally distinct, with the keys and/or rights delivered before the content or vice-versa.

The process used for encryption and for management of the media, keys and rights is not critical to the present invention and so will not be described in further detail here. One such scheme is described in U.S. Pat. No. 7,076,067, which is hereby incorporated herein by reference.

The access manager 124 and authorization service 127 may be implemented either in server 130 or in a separate and distinct check and action (CA) server 210, as described further below.

The authorization service 127 requests the latest version of the authorization data, which may include diagnostic data and remedial data from the database 128 to be sent to the client scanner 118 through access manager 124. This request is like a diagnostic data "ping" of the access manager 124 or authorization service 127. The diagnostic scanner 118 uses the diagnostic data to scan the client device 102, to determine the client device 102 environment and compare that determined client device 102 environment with an expected environment, which may also be included in the diagnostic data. In embodiments wherein the diagnostic data comprises a blacklist, the scanner 118 scans the client device 102 for items on the blacklist that are executing or stored on the client device 120.

As mentioned above, elements of the diagnostic data may have an associated priority level. The items perceived to have the greatest risk associated with them (typically because those items are most widespread) may checked for first. If no items with the highest priority are detected, then the access manager daemon 116 may allows further operations on the client device 102 while lower priority items on of the diagnostic data are checked for. This allows the system to perform quickly and so be user friendly, while still providing adequate protection for the media content. In the preferred embodiment all checking is carried out in parallel with the DRM transactions.

The DRM processes and delivery of keys and the media work can proceed, as described in for example U.S. Pat. No. 7,076,067. In this system, the rights to receive keys are first sent to the client device 102 from the digital rights management server 208 via server 130. The rights to receive keys may include the URL to access the content server 204, the URL to access the key server 206 and tokens for such communication. Each such token is single-use and is associated with a particular piece of content. The keys are then requested and downloaded to the client from the key server 206 and used to decrypt the encrypted content downloaded or streamed from the content server 204. The diagnostic and remediating data may be downloaded as part of keys or token delivery payload.

In order to guard against threatening processes that are loaded after session set up with the server 130, the scanner 118 executing on the client 102 may check the client device 102 using the diagnostic data throughout the process of obtaining rights and keys and playback of the media file. Repeat scans can be performed on a periodic basis, or scanning may be done continuously and cyclically.

A variety of schemes may be employed using the priority levels associated with each item specified by the diagnostic data. For example, high priority items may be checked every few seconds whereas low priority items may be checked only on channel set up. In effect, the diagnostic data may be categorized into different sub-data categories. For example, if the diagnostic data comprises a blacklist, there may be several different blacklists, divided based on priority, each blacklist processed on the client device 102 according to a different scheme.

The diagnostic data must be kept up-to-date in order to be effective. Ideally, the diagnostic data is updated centrally by a dedicated service and sent to the access manager 124. The access manager daemon 116 on the client 102 periodically, or based on transactions, requests updated diagnostic data. This may be done as a diagnostic data "ping" having an authorization request in which the client device 102 sends the version of the diagnostic data that is currently persistently stored to the diagnostic data manager 126 via the authorization service 127 and the access manager 124. The diagnostic data manager 126 may then return an updated a list or a list of additions and deletions from the diagnostic on the client 102. Alternatively, updated diagnostic data may be sent from the access manager 124 to client devices 102 on a periodic basis during secure connection.

In one embodiment, the foregoing is performed by a device authorization service 127 that provides the authorization data (e.g. diagnostic and remedial data) to client devices 102. The authorization service 127 may be implemented in each service provider's network 104 in server 130 or may be a separate CA server 210.

Client devices 102 may contact the authorization service 127 once at the beginning of time, prior to registration with the subscriber management system 212. Thereafter, the client device 102 may periodically attempt to contact the authorization service 127. The authorization service 127 may also provide not only the authorization data (diagnostic data and remedial data) but also the expiration time of the authorization data (e.g. the time after which the client device 102 must attempt to retrieve a fresh set of authorization data). The authorization data returned by the authorization service 127 also describes what action must be performed if the device is determined to be compromised (e.g. rooted).

As further described below, provision may be made for the client device 102 to execute the checks of in the most recently obtained authorization data, should no updated authorization data be available, even when there is no network connectivity with the authorization service 127 (as indicated by no response to a ping of the server hosting the access manager 124, for example, CA server 210 or 130). Such previously stored authorization data may be relied upon a predetermined number (e.g. no more than six) of times after the previous successful retrieval of authorization data. After that, the client 102 may deems the device as compromised or "rooted," and perform a remedial action configured by the access manager 124 of the service provider 104 and sent to the client device 102. The actions specified by the service provider 104 vary widely in level of protection and user experience.

In summary, the client device 102 transmits an authorization request to the authorization service 127. The authorization request may comprise data such as data identifying the manufacturer and model of the client device 102, the plug in library 132 contents or version, and the client device 102 operating system and version. The authorization service 127 transmits authorization data to the client device 102, which includes data describing an expected client device 102 environment (e.g. a blacklist of items which are expected to be absent from the client device 102, and remedial action for the client device to take depending on how the actual client device 102 environment differs from the expected environment. The client device 102 determines its environment, compares the determined environment with the expected environment, and depending on that comparison, takes the remedial action defined in the authorization data. Such remedial action may include deleting previously obtained content keys and exiting the media player 114 application, or simply refusing to retrieve other keys, for the same or other media, while allowing the media player 114 application to continue.

Exemplary Process Flow

FIGS. 2A-2C are diagrams illustrating exemplary operations for authenticating the client device 102.

Establishing and Confirming Communication with the Authorization Service

The client device 102 establishes communication with the service provider 104, and the client device 102 and service provider 104 authenticate each other. In one embodiment, this is accomplished by establishing an HTTP or HTTPS connection with the an element of the service provider network 104 to transmit the authorization request and receive the authorization data.

If HTTPS is used, the service provider 104 may be responsible to provide the client devices 102 with certificates (and optionally, client device 102) authentication and manage such certificate provision and maintenance. The service provider 104 may set appropriate expiration times for these certificates.

The client device 102 authenticates the authorization services, irrespective of whether HTTP or HTTPS is used as the transport/session protocol. The client device 102 may encrypt parameters sent to the service provider 104 using a key (e.g. a hard coded RSA2048 public key). One of the parameters transmitted to the authorization service may include a client device 102 specific key (such as an AES128 key), that is later used by the service provider 104 to encrypt the authorization response to the client device 102. This ensures that the authorization checks are not too easily visible to an unauthorized client device 102. This also allows the authorization operations provided by the authorization service 127 to work independently of a particular service provider's network plan, including, for example, HTTPS connections from a client device 102 terminating at a load balancer and no HTTPS between the said load balancer and the access manager 124.

In block 306, the client device 102 confirms network connectivity with the authorization service 127. In one embodiment, the authorization service 127 is implemented behind or by access manager 124 through which digital rights information required for use of the content is obtained.

Although a global authorization service 127 for all content providers 104 may be implemented, in one embodiment, each content provider 104 maintains a distinct authorization service 127 for the content they provide. This architecture (wherein the authorization service 127 is deployed in the service provider 104 network and can be communicated with via the same communication connectivity by which necessary digital rights are obtained to the content) makes it easier accurately identify cases where a client device 102 purposely refuses to reach the authorization service 127. This is because it is unlikely that the authorization service 127 is not reachable while other elements of the service provider 104 (such as server 130) is reachable in the same service provider network 104. When a client device 102 does not contact the authorization service 127, but can reach the access manager 124 implemented by either server 130 or CA server 210, it is an indication of potential fraud. For example, on a plane without WiFi service or other network connectivity, the client device 102 is offline. In this case, that the client device 102 is unable to reach the authorization service 127 is not indicative of fraud as every other element of the service provider network 104 would also be unreachable, including the server 130 in an embodiment where the access manager 124 is implemented in CA server 210.

Accordingly, in one embodiment, network connectivity is confirmed via a ping transmitted via the same network connectivity or communication path that the client device 102 uses to obtain rights to consume the content (e.g. by communication with server 130 when the access manager 124 is implemented by CA server 210). The advantage in such a system is that, absent fraud or device 102 compromise, if there is inadequate network connectivity to respond to the ping, there should be inadequate network connectivity to obtain the information necessary to decode and consume the content itself, as further described below.

The client device 102 may attempt to determine network connectivity by transmitting pings periodically, aperiodically, or according to particular events. For example, a ping may be transmitted as indicated by an application or application program interface (API) executing on the client device 102, or upon client device 102 restart.

Block 310 determines if there is network connectivity, for example, based on the response to the ping transmitted by the client device 102. If there is connectivity, processing is directed to block 318, where an authorization request is generated.

Generating and Transmitting an Authorization Request

In block 318, the client device 102 generates an authorization request. That authorization request is then transmitted to the authorization service 127 using the network connectivity confirmed by the ping. The authorization request may include client device 102 such as the make of the client device 102, the model of the client device 102, the library 132 of DRM functions implemented in the client device 102, a key of the client device 102 used for communication (for example, the AES 128 key, if not already transmitted), and the operating system (OS) of the client device 102. Other parameters, such as a unique client device 102 identifier (e.g. a serial number) may also be transmitted.

The authorization service 127 receives the authorization request, as shown in block 322, and generates an authorization response, as shown in block 324. In one embodiment, the authorization data of the authorization response is determined at least in part from the attributes of the client device 102 transmitted with the authorization request.

Although illustrated as being generated in response to the received authorization request, the authorization response may be generated before receipt of the authorization request. For example, an authorization response for all client devices 102 of a particular make, model, client library 132 version, and OS may be generated in advance of receipt of the authorization request. After the client device 102 transmits the authorization request, it waits for an authorization response from the authorization service 127, as shown in block 321.

The authorization response may be optionally encrypted 325 using the client device 102 key transmitted in the authorization request before transmission to the client device 102, as shown in blocks 326 and 328.

The authorization response comprises authorization data, which includes client device 102 diagnostic data and client device 102 remedial data. In one embodiment, the device diagnostic data includes a required client device 102 environment for the consumption of the content. One example of such diagnostic data is the blacklist described above. The device diagnostic data may also include instructions for performing an assessment of the environment or operating status of the client device 102, thus permitting the client device 102 to be updated to perform checks that were not envisioned when the client device 102 was produced and distributed to consumers.

The authorization data may also comprise a temporal time period after which the client device 102 must attempt to retrieve a fresh set of authorization data.

Block 330 checks to determine whether the client device 102 has received an authorization response within an expected time period needed for the authorization service 127 to generate and transmit the authorization response. If an authorization response is provided with the requested authorization data within the expected time, the authorization data decrypted using the client device key (if encrypted by the authorization server 130) and persisted, for example, by storage in non-volatile memory, as shown in block 334. If the authorization response is not provided within the expected time period, block 330 routes processing to block 332, which is further discussed below.

In one embodiment, the client device 102 persists the authorization data in a file system of the client device 102, as a file. For example, on ANDROID devices the authorization data may be persisted in the application specific directory in "/data/data." The stored authorization data may be encrypted using the same encryption techniques used for other persistent storage on the device.

In one embodiment, in addition to the authorization data received from the authorization server 130, the client device 102 also persists the device attributes, that the authorization service 127 may have used to determine which authorization data is best used authenticate and remediate (if necessary) the device 102. Such attributes may include: (1) the manufacturer or make of the client device 102, (2) the model of the client device, (3) the plug in library 132 version or description, and (4) the version of the platform (iOS or Android, and the operating system version).

Processing is then routed to block 336, which checks to determine if the device 102 environment is the expected device 102 environment described in the device diagnostic data. In one embodiment, this is accomplished by determining the environment of the client device 102, and comparing that determined environment of the client device 102 to the expected environment of the client device 102 as described in the diagnostic data. If the determined environment compares favorably with the expected or required environment, block 338 routes processing to block 342.

The above-described comparison between the determined device 102 environment and the required device 102 environment may be accomplished in different ways. For example, as described earlier, in one embodiment, the device diagnostic data comprises a black list of applications or data structures that must not be determined to be present on the client device 102. The blacklisted applications and/or data structures may be prioritized so that the scanner 118 scans for particular blacklisted applications and/or data structures in a particular order or priority. This can be helpful in not only eliminating the most onerous blacklisted items first, but also in finding the blacklisted items themselves. For example, a particular debugger might be blacklisted, and identification of that debugger on the client device 102 may be used to search for and identify other blacklisted items (such as might be the case when a blacklisted item is ordinarily received with related blacklisted items as well). In one embodiment, when a blacklisted item is found, the client device 102 is determined to be compromised, and no further determination regarding other blacklisted items need be made. In other embodiments, processing continues to identify all blacklisted items before continuing to determine which remedial action to take.

The device diagnostic data may also comprise a "grey list" that comprises the blacklisted items along with a blacklisted item weight or ranking. This embodiment supports a system wherein discovery of one of the greylisted items does not necessarily abort the provision of the content by the client device 102. The client item is scanned to identify whether any of the greylisted items are present, and the rating/weighting of each discovered greylist item is retrieved and processed (typically, summed) to determine a weighted value that indicates the degree to which the client device 102 is compromised. Such information can be used to determine how to respond to the comparison, as described further below and in U.S. Patent Application 2011/0030069.

The device diagnostic data may also comprise other diagnostic data. For example, the device diagnostic data may comprise "challenge" data to be input to processes executing on the client device 102, and an expected result from the process. If the input/output pair is not as expected, it may be ascertained that the process itself is not as expected, and appropriate action taken. In another example, the diagnostic data may comprise instructions for executing checks on the client device as well as or in the alternative to the blacklist.

XML Serialization

In one embodiment, the authorization data comprising of the aforesaid expected device environment and/or configuration and remedial actions are serialized in extensive markup language (XML) with types of checks and specific instances of the type of check. In other embodiments the aforesaid authorization data may be serialized in JSON or any other format.

If the determined environment does not compare favorably with the required environment described in the device diagnostic data, processing is passed to block 340, which takes remedial action as described in the device remedial data received from the authorization server 106 in the authorization data. Since the remedial action is specified at least in part in the remedial data provided in the authorization response, the remedial actions are remotely configurable by the service provider 104.

Device Remedial Action

In one embodiment, the device 102 remedial action specified in the device remedial action data (and hence under the control of the service provider 104 via the authorization service 127) can be generally categorized as either shutting down the client device 102 or not shutting down the client device 102. In this context, "shutdown" may include one of a plurality of options:

First Remedial Action: One possible remedial action is a complete shutdown of the client device 102. This remedial action provides the most secure remedial action, but also results in a poor user experience. This remedial action may (1) delete all registration information from the client device (2) delete the session key used to communicate with the authorization server 130 (3) delete all client identity information, including the client device 102 public and private keys (4) exit the media player application 114. The media keys for decrypting the content are typically stored only in volatile memory, and will automatically become unavailable upon process termination or device shutoff. Any keys sent by the client device 102 to the authorization service 127, or even any element of the service provider 104 also disappears.

With this remedial action, the user experience could be adverse because the middleware media player 114 application process is terminated. Also, since all client identity, registration information and keys are deleted, the client device 102 must re-register with the service provider 104, and the service provider 104 configured to allow such re-registration, potentially requiring operator intervention by the user of the client device 102 or the service provider 104. This further negatively impacts the experience of users of the client device 102.

Second Remedial Action: In this remedial action, all keys are deleted, including all media keys, the any public key obtained during registration with the service provider 104, the session key, and the AES128 key sent from the client device 102 to the authorization service 127. Further, the client device 102 identity information is deleted. Accordingly, the media player 114 cannot decrypt content. Further, pings (e.g. block 306) and requests for authorization data (block 320) are not transmitted.

To the extent that the media player 114 and related processes do not abruptly terminate, the user experience is better than that of the first remedial action. However, re-registration is required, and re-registration requires operator intervention. The user of the client device 102 must also restart the media player 114 application to resume service, if the underlying causes for the shutdown (e.g. inability to contact the authorization service 127 or a determination that the device is compromise).

Third Remedial Action: Another possible remedial action deletes all media keys and ceases any decryption of encrypted content. Further retrieval of media keys through middleware initiated "request service" invocations are not entertained by the plug-in libraries 132. The client device 102 also no longer transmits pings to the service provider 104. However, the registration-related information (service provider public key, the session key and client identity information) are not deleted, nor is the AES 128 key used to communicate with the authorization service 127 is not deleted, and the client device 102 continues to run the media player 114. Although the media player 114 cannot decrypt content without the now-missing media keys, unencrypted content, which may include messages or information on how to re-establish provision of content may be decoded and presented. Further, the authorization service 127 continues to be periodically or aperiodically contacted for the latest authorization data.

From the perspective of security, the second remedial action is inferior to the first remedial action, since media keys are still available in the client device 102 for a hacker to access and analyze. However, since the media player 114 and associated processes do not exit, the client device 102 is still able to present some content (which may present error messages or messages describing how to regain access to the content), and the client device 102 can re-contact the authorization service 130 (e.g. block 320) to obtain new authorization data without re-registration.

Other remedial actions include deleting the blacklisted item, setting a bug to monitor processing to determine if the blacklisted items is executed again, setting or clearing flags, and/or blowing a security fuse to disable some or all of the functionality of the media device or change its characteristics.

Determination of Remedial Action: The foregoing paradigm permits the service provider 104 (perhaps upon direction of the entities providing the content itself, such as movie studios) to identify the extent of protection required balanced against a negative user experience. Importantly, weak levels of protection may be little better than none at all.

An important consideration in determining the extent of the remedial action is a real world reality that "false positives" may occur and that the chosen option may pose a greater collective detriment to users than a deterrent to a potential hacker. Accordingly, care must be taken by the service provider 104 that optimally balances such factors.

After remedial action is taken, processing is passed to block 342, which determines whether the client device 342 is registered. If the client device 102 has not been registered, a registration request is transmitted to the service provider 104. The registration request may include for example, an identity of the user, and the client device 102 as well as credentials of the client device 102.

Of note is that the registration process does not occur until at least one authorization request has been sent to the authorization service 127, and authorization data received and acted upon as described above. Accordingly, the client device 102 will typically request and process authorization data and take the specified remedial action before the first use of the client device 102 by the user.

As described further below, authorization checks (e.g. making an authorization data request, receiving authorization data, using that data to check the environment of the client device 102 and taking the remedial actions specified in the authorization data as required) may also be performed when explicitly requested by the media player 114 or associated processes, when the media player 114 initializes or restarts, or when the media player application 114 is updated. Authorization checks may also be performed periodically in a processing loop (e.g. © from block 342 to © entering block 306) that includes an instruction to ping elements of the service provider network 104.

Provision is made for situations wherein the client device 102 has no network connectivity with the authorization service 127. As described above, under such situations, the client device 102 may be unable to receive the authorization data but should also be unable to retrieve content for lack of service provider network 104 connectivity. However, the device 102 can be used to play back previously obtained content, while still providing for authorization checks as described below.

As described above, the client device 102 periodically (for example, in the ping processing loop) attempts to retrieve the latest set of authorization checks from the authorization service 127. If the client device 102 cannot reach the authorization service 127, the client device 102 executes a check using the most recently received valid authorization data. However, if the previously received authorization data has gone stale or expired, the client device 102 does not permit decryption of content. These features are further described below.

Returning to FIG. 3A, if block 310 determines that there is no network connectivity between the client device 102 and the authorization service 127 (e.g. via the ping transmitted in block 306), processing turns to block 312, which determines if the most recently downloaded and persisted authorization data has expired. If this authorization data has not expired, processing is routed again to block 318 to perform an authorization check as defined in the currently persisted diagnostic data and take remedial action if necessary.

Whether the most recently received and persisted authorization data has "expired" can be determined temporally (e.g. how much time has elapsed since the authorization data was received), operationally (e.g. how many authorization checks have been performed using the authorization data), or both. Data describing how "expired" is determined is typically returned with the authorization data from the authorization service 127. For example, the authorization data may include not only device diagnostic data and remedial action data, but also an indication that the authorization data expires after the passage of a particular amount of time.

If the persisted authorization data has expired, processing is passed to block 313, which disables the decryption of the content (e.g. by deleting the media keys or other artifice), and processing is returned to block 306 to continue to attempt to ping the authorization service 127.

If the persisted authorization data has not expired, processing is passed to block 314, which determines whether there has been a change in a client device 102 attribute that implicates a potential security issue (for example, downloading of a new operating system version). If there has been such an attribute change, processing is routed to block 315, which discards any persistent authorization data and routes processing to block 306 for further pinging of the authorization service 127. If there has been no attribute change affecting the security of the device, processing is passed to block 336, and the client device 102 is checked and remedial actions taken in accordance with the authorization data. If there has been an attribute change, processing is routed to block 306, wherein a ping is again transmitted to confirm network connectivity, and if there is network connectivity, processing is again routed to block 318, and the client device 102 generates a new authorization request based upon the changed attributes, transmits the request in an attempt to retrieve new authorization data based on the changed attributes to the authorization service 127.

Figure 3A:
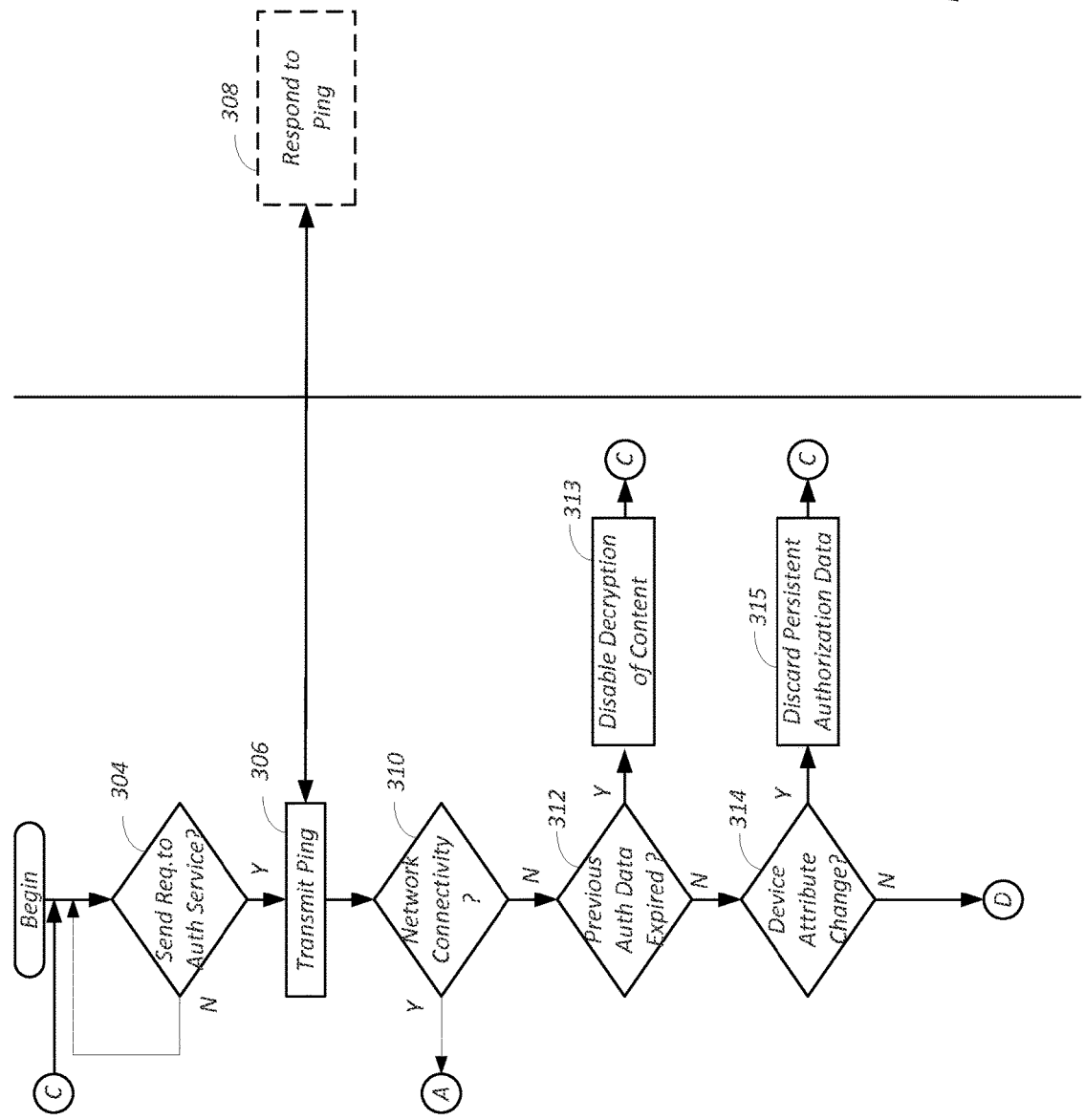
Figure 3B:
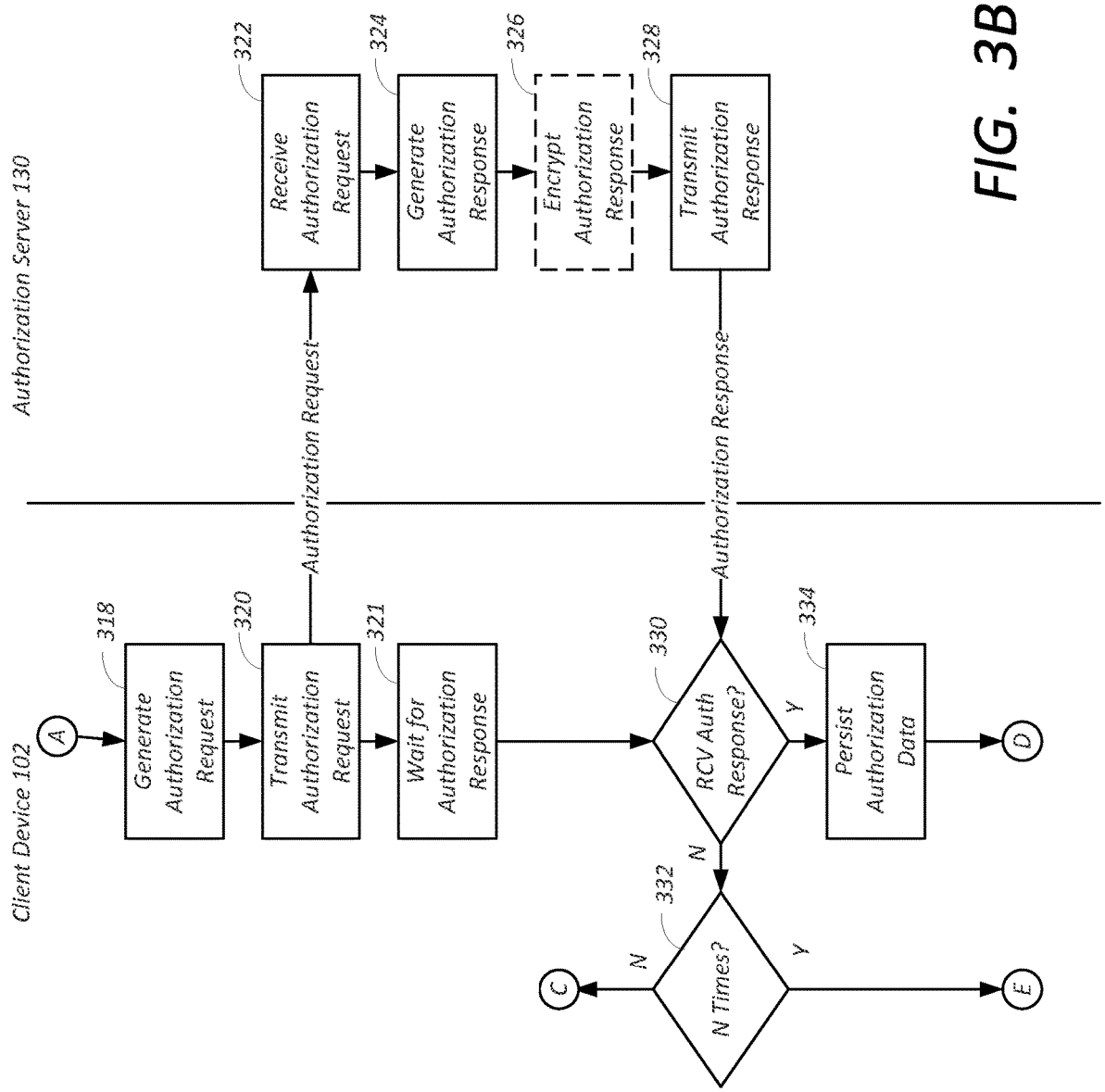

In one embodiment, if the client device cannot receive authorization data for the changed attributes, processing proceeds as shown in FIGS. 3A-3B, with additional pinging to confirm network connectivity and subsequent authorization requests being transmitted N−1 times before remedial action is taken as shown in block 340. Such remedial action may be a special case of the remedial actions described above, and may disallow further pings 306 of ES services and the decryption of video, or further pings may be permitted. Similar action may be taken if the client device 102 is able to receive authorization data based upon the changed device attributes, but the device fails the test of block 336.

Alternatively, if the client device 102: (1) cannot retrieve authorization data for the changed attributes or (2) can receive such authorization data, but the authorization check of block 326 indicates that the device is compromised, the client device 102 may be configured to forbid further pings and to disables the decryption of content. In this case, the failure to receive authorization data and successfully confirm the environment of the client device 102 is analogous to the case wherein the client device has no previously downloaded and persisted authorization data and attempts to reach the authorization server, for the very first time, prior to registration.

As described above, block 330 of FIG. 3B determines whether an authorization response is received in the client device 102 from the authorization server 130. If an authorization response is not received (or if it is damaged, unusable or determined to be unauthentic), processing is routed to bock 332.

Authorization requests are not transmitted to the authorization service 127 unless a previous ping (e.g. as performed in block 306) indicates that there is network connectivity between the client device and the server or other entity providing communication with the authorization service 127. Accordingly, a positive ping result along with a failure to receive an authorization response is an indication that attempts may be being made to circumvent the requesting for or block the reception of authorization data. In one embodiment, this causes the client device 102 to route processing to either block 340 to take remedial action, to block 306 to attempt another ping, or to block 313 to disable decryption of the media content. However, because the network connectivity may be intermittent, another embodiment re-attempts connection with the authorization service 127 and re-attempts to obtain the authorization data from the authorization service 127, as shown in block 332. This process can be repeated N times, with N being the number of times that a ping is successful, but nonetheless, authorization data is not received from the authorization service 127 in response to an authorization request within an expected period of time (a failure to receive authorization data in response to a request is not included in the count unless the previous ping indicated network connectivity). If authorization data has not been received within the expected time period and after a recent successful ping N or more times, processing is routed to block 340, where appropriate remedial action is taken. If desired, the persisted authorization data (the most recently received) may be used to check the client device 102 configuration (e.g. block 336) before taking the remedial action of block 340.

Accordingly, the client device 102 keeps a count of the number of times after a successful retrieval of authorization checks from the authorization service 127, when it could not retrieve a set of authorization checks, but was able to ping the service provider network 104. If that number exceeds a particular number (which may be predetermined, transmitted with the authorization data, or based on the outcome of a previous device configuration check using the authorization data), the device 102 may disable decryption of the content (block 313) or take any action configured by the service provider 104 via the remedial action data of the authorization response, as shown in block 340 and discussed above.

Hardware Environment

Figure 4:
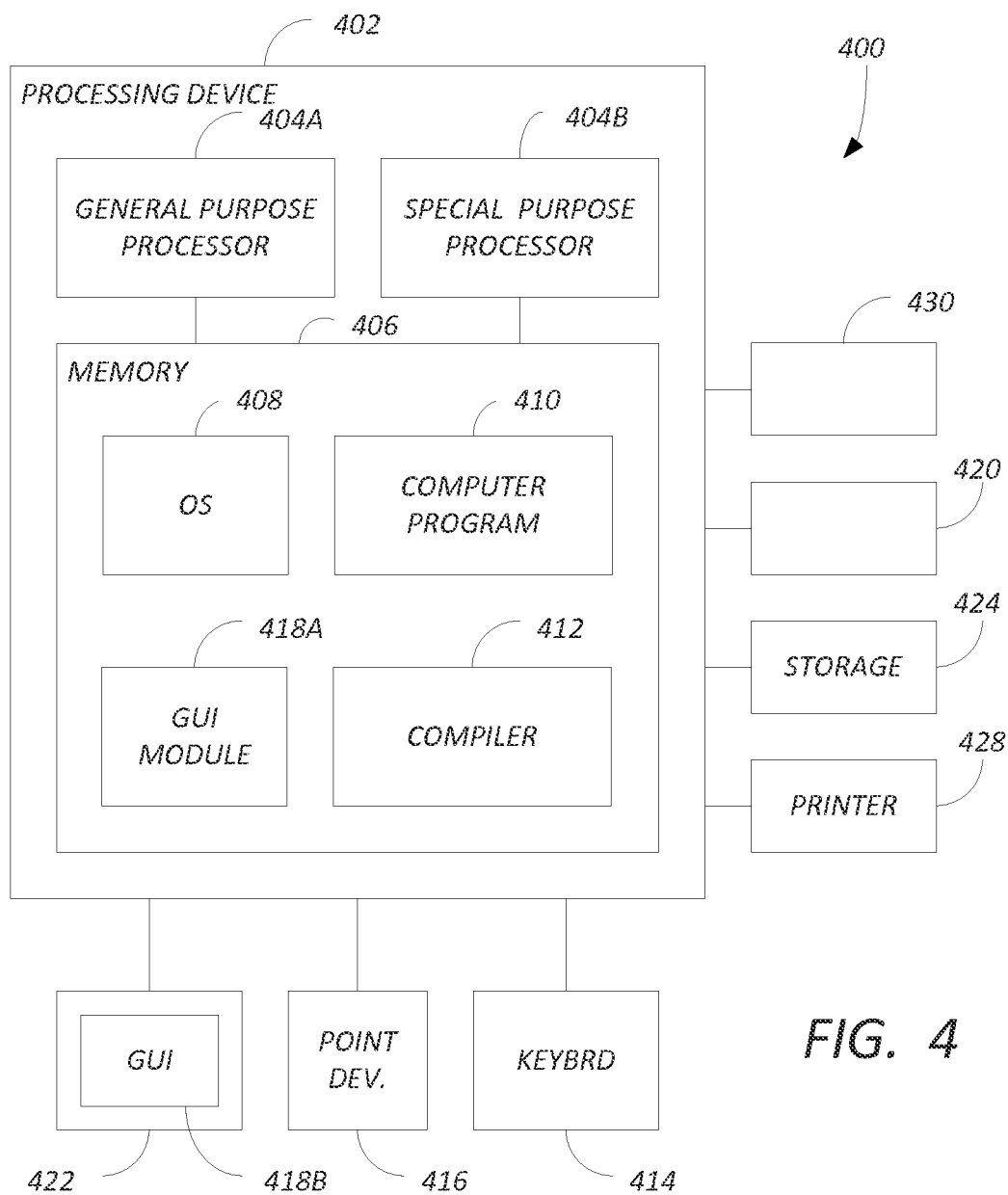
FIG. 4 is a diagram illustrating an exemplary processing system that could be used to implement elements of the content distribution system

FIG. 4 is a diagram illustrating an exemplary processing system 400 that could be used to implement elements of the content distribution system 100, including the client device 102, encryption server 202, content server 204, key server 206, digital rights management server 208, authorization server 130, and/or subscriber management system 212. The system comprises a processing device 402 that includes a general purpose hardware processor 404A and/or a special purpose hardware processor 404B (hereinafter alternatively collectively referred to as processor 404) and a memory 406, such as random access memory (RAM). The processing device 402 may be coupled to other devices, including input/output (I/O) devices such as a keyboard 414, a mouse device 416 and a printer 428.

In one embodiment, the processing device 402 operates by the general purpose processor 404A performing instructions defined by the computer program 410 under control of an operating system 408. The computer program 410 and/or the operating system 408 may be stored in the memory 406 and may interface with the user and/or other devices to accept input and commands and, based on such input and commands and the instructions defined by the computer program 410 and operating system 408 to provide output and results.

Output/results may be presented on the display 422 or provided to another device for presentation or further processing or action. In one embodiment, the display 422 comprises a liquid crystal display (LCD) having a plurality of separately addressable pixels formed by liquid crystals. Each pixel of the display 422 changes to an opaque or translucent state to form a part of the image on the display in response to the data or information generated by the processor 404 from the application of the instructions of the computer program 410 and/or operating system 408 to the input and commands. Other display 422 types also include picture elements that change state in order to create the image presented on the display 422. The image may be provided through a graphical user interface (GUI) module 418A. Although the GUI module 418A is depicted as a separate module, the instructions performing the GUI functions can be resident or distributed in the operating system 408, the computer program 410, or implemented with special purpose memory and processors.

Some or all of the operations performed by the processing device 402 according to the computer program 410 instructions may be implemented in a special purpose processor 404B. In this embodiment, some or all of the computer program 410 instructions may be implemented via firmware instructions stored in a read only memory (ROM), a programmable read only memory (PROM) or flash memory within the special purpose processor 404B or in memory 406. The special purpose processor 404B may also be hardwired through circuit design to perform some or all of the operations to implement the present invention. Further, the special purpose processor 404B may be a hybrid processor, which includes dedicated circuitry for performing a subset of functions, and other circuits for performing more general functions such as responding to computer program instructions. In one embodiment, the special purpose processor is an application specific integrated circuit (ASIC).

The processing device 402 may also implement a compiler 412 which allows an application program 410 written in a programming language such as COBOL, C++, FORTRAN, or other language to be translated into processor 404 readable code. After completion, the application or computer program 410 accesses and manipulates data accepted from I/O devices and stored in the memory 406 of the processing device 402 using the relationships and logic that was generated using the compiler 412.

The processing device 402 also optionally comprises an external communication device such as a modem, satellite link, Ethernet card, or other device for accepting input from and providing output to other computers.

In one embodiment, instructions implementing the operating system 408, the computer program 410, and/or the compiler 412 are tangibly embodied in a computer-readable medium, e.g., data storage device 420, which could include one or more fixed or removable data storage devices, such as a zip drive, floppy disc drive 424, hard drive, CD-ROM drive, tape drive, or a flash drive. Further, the operating system 408 and the computer program 410 are comprised of computer program instructions which, when accessed, read and executed by the processing device 402, causes the processing device 402 to perform the steps necessary to implement and/or use the present invention or to load the program of instructions into a memory, thus creating a special purpose data structure causing the computer to operate as a specially programmed computer executing the method steps described herein. Computer program 410 and/or operating instructions may also be tangibly embodied in memory 406 and/or data communications devices 430, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the processing device 402.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of authorizing a device for playing back video content, comprising:

generating an authorization request to enable the device to receive video for playing back, the authorization request for authorization data comprising device diagnostic data and device remedial data;

transmitting the authorization request from the device to a remote authorization service and authorizing or remediating the device according to an authorization response to the authorization request received from an authorization service, wherein the authorization response comprises an identification of one or more threatening processes or data types and instructions for performing appropriate remedial action, and wherein authorizing or remediating the device comprises:

determining whether one or more of the one or more threatening processes or data types are present at the device; and if one or more of the one or more threatening processes or data types are present at the device, performing the appropriate remedial action identified from the authorization response;

transmitting a diagnostic ping from the device to an access service providing data required to use the content, wherein the diagnostic ping checks for connectivity, wherein the data provided by the access service comprises a media key for decrypting content, and wherein the authorization service is distinct and separate from the access service providing data required to use the content;

determining communication connectivity between the device and the authorization service via the same communication connectivity as between the device and the access service providing data required to use the content, wherein a determination is made that no communication connectivity exists between the device and the authorization service when no response to the diagnostic ping is received from the access service providing data required to use the content;

wherein the authorization request is generated by the device after expiration of the authorization data most recently received by the device, including expiration of the device remedial data that occurs by not timely confirming accurate digital rights management (DRM) information due to lack of response by the remote authorization service for a period of time, and wherein the authorization request is only transmitted when the determination is made that communication connectivity exists between the device and the authorization service.

2. The method of claim 1, wherein the device diagnostic data comprises a description of a required device environment for the playing back the content and the device remedial data describes required device remedial action to be performed if the device is not in the required environment.

3. The method of claim 1, wherein authorizing or remediating the device according to the authorization comprises:
determining if an authorization response comprising the authorization data is received from the authorization service;
if the authorization response is received from the authorization service;
(a) determining a device environment for the consumption of the content;
(b) if the determined device environment differs from the required device environment, remediating the device according to the device remedial data.

4. The method of claim 3, further comprising:
if the authorization response is not received from the authorization service, determining if previous authorization data most recently received by the device has expired;
if the previous authorization data has expired:
retransmitting the authorization request up to N-1 times until an authorization response is received; and performing steps (a) through (b);
if the previous authorization data has not expired:
determining the device environment for the consumption of protected video data; and
if the determined device environment differs from a required device environment of the previous authorization data, performing a device remedial action according to the device remedial data of the previous authorization data.

5. The method of claim 4, wherein the device remedial action comprises one of shutting down the device and not shutting down the device.

6. The method of claim 5, wherein the device plays back the content via execution of a playback process, and wherein:
the device stores:
the digital rights management (DRM) registration information including but not limited to one or more server keys in persistent device storage;
client identity information including client keys in the persistent device storage;
one or more content keys for decrypting the content in persistent storage;
a session key for communicating with the server in impersistent storage;
one or more content keys for decrypting the content in impersistent storage; and
the remedial action comprises shutting down the device comprising:
deleting the DRM registration information, the client identity information, content keys in persistent storage and terminating playback process thereby rendering the one or more content keys in impersistent storage unavailable for use.

7. The method of claim 5, wherein the device plays back the content via execution of a playback process and wherein:
the device stores:
the digital rights management (DRM) registration information including one or more server keys in persistent device storage;
client identity information comprising client keys in the persistent device storage;
one or more content keys for decrypting the content in persistent storage;
a session key for communicating with the server in impersistent storage;
one or more content keys for decrypting the content in impersistent storage;
the remedial action comprises not shutting down the device, comprising:
deleting the one or more content keys and retaining the DRM registration information, the client identity information, and the session key.

8. The method of claim 5, wherein the device plays back the content via execution of a playback process, and wherein:
the device stores:
the digital rights management (DRM) registration information including server keys in persistent device storage;
client identity information including client keys in the persistent device storage;
a session key for communicating with the server in impersistent storage;
one or more content keys for decrypting the content in impersistent storage;
the remedial action comprises not shutting down the device, comprising:
deleting the one or more content keys and retaining the DRM registration information, the client identity information, and the session key and refusing to retrieve any content keys in the future.

9. The method of claim 1, wherein the authorization request is further generated by the device after at least one of:
an explicit request by an application on the device;
triggering of a periodic timer created and maintained by an application, for purposes of generating the said request, on the device;

a restart of the device; and
a change in an attribute of the device.

10. An apparatus for playing back content, comprising:
a processor;
a persistent memory for storing instructions comprising instructions for
generating an authorization request to enable the processor to receive video for playing back, the authorization request for authorization data comprising device diagnostic data and device remedial data;
transmitting the authorization request from the device to an authorizing service; and
authorizing or remediating the device according to an authorization response to the authorization request received from an authorization service, wherein the authorization response comprises an identification of one or more threatening processes or data types and instructions for performing appropriate remedial action, and wherein authorizing or remediating the device comprises:
determining whether one or more of the one or more threatening processes or data
types are present at the device; and
if one or more of the one or more threatening processes or data types are present
at the device, performing the appropriate remedial action identified from the authorization response;
transmitting a diagnostic ping from the device to an access service providing data required to use the content, wherein the diagnostic ping checks for connectivity, wherein the data provided by the access service comprises a media key for decrypting content, and wherein the authorization service is distinct and separate from the access service providing the data required to use the content;
determining communication connectivity between the device and the authorization service via the same communication connectivity as between the device and the access service providing data required to use the content, wherein a determination is made that no communication connectivity exists between the device and the authorization service when no response to the diagnostic ping is received from the access service providing data required to use the content;
wherein the authorization request is generated by the device after expiration of the authorization data most recently received by the device, including expiration of the device remedial data that occurs by not timely confirming accurate digital rights management (DRM) information due to lack of response by the remote authorization service for a period of time, and wherein the authorization request is only transmitted when the determination is made that communication connectivity exists between the device and the authorization service.

11. The apparatus of claim 10, wherein the device diagnostic data comprises a description of a required device environment for the playing back of the content and the device remedial data describes required device remedial action to be performed if the device is not in the required environment.

12. The apparatus of claim 11, wherein the instructions for authorizing or remediating the device according to the authorization comprise instructions for:
determining if an authorization response comprising the authorization data is received from the authorization service;
if the authorization response is received from the authorization service;
(a) determining a device environment for the consumption of the content;
(b) if the determined device environment differs from the required device environment, performing device remedial action according to the device remedial data;
if the authorization response is not received from the authorization service, determining if previous authorization data most recently received by the device has expired;
if the previous authorization data has expired:
retransmitting the authorization request up to N-1 times until an authorization response is received; and
performing steps (a) through (b);
if the previous authorization data has not expired:
determining the device environment for the consumption of protected video data; and
if the determined device environment differs from a required device environment of the previous authorization data, performing a device remedial action according to the device remedial data of the previous authorization data.

13. The apparatus of claim 12, wherein the device remedial action comprises one of shutting down the device and not shutting down the device.

14. The apparatus of claim 13, wherein the device plays back the content via execution of a playback process, and wherein:
the device persistent memory stores:
the digital rights management (DRM) registration information comprising one or more server keys;
client identity information comprising client keys;
one or more content keys for decrypting the content;
a session key for communicating with content server in impersistent storage;
a device impersistent memory stores:
the one or more content keys for decrypting the content; and
the remedial action comprises shutting down the device comprising:
deleting the registration information, the client identity information, content keys in persistent storage and terminating playback process thereby rendering the one or more content keys in impersistent storage unavailable for use.

15. The apparatus of claim 13, wherein the device plays back the content via execution of a playback process, and wherein:
the device persistent memory stores:
the digital rights management (DRM) registration information comprising a one or more server keys;
client identity information comprising client keys;
one or more content keys for decrypting the content;
a device impersistent memory stores:
the one or more content keys for decrypting the content;
a session key for communicating with the server; and
the remedial action comprises not shutting down the device, comprising:
deleting the one or more content keys and retaining the DRM registration information, the client identity information, and the session key.

* * * * *